US012528684B2

(12) United States Patent
Corriher

(10) Patent No.: US 12,528,684 B2
(45) Date of Patent: Jan. 20, 2026

(54) HIGH-STRENGTH, LAMINATED PALLET FORK TINES

(71) Applicant: Theodore Corriher, Terrell, NC (US)

(72) Inventor: Theodore Corriher, Terrell, NC (US)

( * ) Notice: Subject to any disclaimer, the term of this patent is extended or adjusted under 35 U.S.C. 154(b) by 334 days.

(21) Appl. No.: 18/195,872

(22) Filed: May 10, 2023

(65) Prior Publication Data

US 2023/0365385 A1 Nov. 16, 2023

Related U.S. Application Data

(60) Provisional application No. 63/342,280, filed on May 16, 2022.

(51) Int. Cl.
*B66F 9/12* (2006.01)

(52) U.S. Cl.
CPC ..................................... *B66F 9/12* (2013.01)

(58) Field of Classification Search
CPC ........................................................ B66F 9/12
See application file for complete search history.

(56) References Cited

U.S. PATENT DOCUMENTS

| | | | | |
|---|---|---|---|---|
| 2,596,747 A * | 5/1952 | Ward | B66F 9/12 414/785 |
| 3,561,628 A | 2/1971 | Melin | |
| 3,754,673 A | 8/1973 | Barda et al. | |
| 4,335,992 A | 6/1982 | Reeves | |
| 4,394,107 A | 7/1983 | Siebert | |
| 4,533,290 A | 8/1985 | Hackauf | |
| 7,744,335 B1 | 6/2010 | Cleary | |
| 9,309,098 B2 | 4/2016 | Lindenmuth et al. | |
| 9,624,080 B2 * | 4/2017 | Szlezak | B23K 15/0006 |
| D796,149 S | 8/2017 | Takaguchi | |
| 9,802,802 B2 * | 10/2017 | Seljestad | B66F 9/12 |
| 10,988,360 B2 | 4/2021 | Cherry et al. | |
| 2004/0086366 A1 | 5/2004 | Henning | |

(Continued)

FOREIGN PATENT DOCUMENTS

| | | | | |
|---|---|---|---|---|
| CN | 109264633 A * | 1/2019 | B66F 9/12 |
| DE | 19515834 C1 * | 5/1996 | B66F 9/12 |
| DE | 102019102846 A1 * | 8/2020 | B66F 9/122 |

(Continued)

*Primary Examiner* — Minh Truong
*Assistant Examiner* — Michelle M Mudwilder
(74) *Attorney, Agent, or Firm* — Muncy, Geissler, Olds & Lowe, P.C.

(57) ABSTRACT

A pallet fork attachment is provided for industrial or farm type vehicles. A tine of the pallet fork attachment includes an upright member and a lifting member. The lifting member extends approximately perpendicularly away from a bottom of the upright member to a toe end. Flat pieces of steel are welded together in a stacked formation to form sections of the upright and lifting members. At least two, more preferably three, of the flat pieces of steel are integral, one-piece members forming a part of both of the upright and lifting members. At least one pocket is created within the upright and/or lifting member between the stacked formations of the flat pieces of steel and between the at least two of the flat pieces of steel which are integral, one-piece members forming a part of both of the upright and lifting members, so as to reduce the weight of the tine.

20 Claims, 7 Drawing Sheets

(56) References Cited

U.S. PATENT DOCUMENTS

| | | | | |
|---|---|---|---|---|
| 2012/0207576 | A1 | 8/2012 | Kraft et al. | |
| 2023/0391595 | A1* | 12/2023 | Perstling | B66F 9/12 |

FOREIGN PATENT DOCUMENTS

| | | | | | |
|---|---|---|---|---|---|
| GB | 666102 | A | * | 2/1952 | B66F 9/12 |
| IT | PD20120280 | A1 | * | 3/2014 | B66F 9/12 |
| SE | 417812 | B | * | 4/1981 | B66F 9/12 |

* cited by examiner

HIGH-STRENGTH, LAMINATED PALLET FORK TINES

This application claims the benefit of U.S. Provisional Application No. 63/342,280, filed May 16, 2022, which is herein incorporated by reference.

BACKGROUND OF THE INVENTION

1. Field of the Invention

The present invention relates to pallet fork attachments for industrial or farm vehicles, such as wheeled or track driven tractors, like skid steers, farming tractors, wheel loaders and excavators. More particularly, the present invention relates to an improved laminated metal pallet fork tine, which is lighter in weight, yet as strong as, a solid metal pallet fork tine.

2. Description of the Related Art

Traditional pallet fork tines can be seen in U.S. Pat. Nos. 3,561,628; 3,754,673; 4,335,992; 4,394,107; 4,533,290; 7,744,335; 9,309,098; 10,988,360 and D796,149 and US Published Applications 2004/0086366 and 2012/0207576, each of which is incorporated herein by reference.

As shown in FIG. 1, the typical pallet fork tine 11 is formed of a solid metal bar, in accordance with the prior art. The metal bar is bent at approximately a ninety-degree angle A. The upper part of the bar is an upright member 13 extending longitudinally between a top 15 of the upright member 13 and a bottom 17 of the upright member 13. A bend 19 at the bottom 17 of the upright member 13 transitions the bar to a lifting member 21, which extends from the bottom 17 of the upright member 13 to a toe 23. One or more mounting attachments 25A and 25B are welded to a back face of the upright member 13 to allow the pallet fork tine 11 to be attached to a lifting frame of a vehicle.

During the manufacturing of the pallet fork tine 11, the metal bar must be tempered, e.g., heat treated, in order to improve the strength of the bend 19. Otherwise, the lifting member 21 may deflect downwardly (increasing the angle A) when a heavy load is being lifted by the pallet fork tine 11. Excess deflection can cause the load to slide off of the pallet fork tine 11, or lead to a failure, e.g., breakage, at the bend 19 of the pallet fork tine 11. Alternatively, the upright member 13 and lifting member 21 may be initially forged into the L-shape.

SUMMARY OF THE INVENTION

The Applicant has appreciated several drawbacks to the pallet fork tine 11 of the prior art. The tempering and/or forging steps add cost and complexity to the manufacturing of the pallet fork tine 11. The equipment to temper and/or forge thick metal bars is expensive to own and operate, and the tempering/forging process is time consuming.

The mounting attachments 25A and 25B must be welded to the back face of the upright member 13. Hence, the welding must be thorough and accurate or the upright member 13 may break free of the mounting attachment 25A and/or 25B and separate from the lifting frame of the vehicle. Such an event could lead to potential injuries and property damage.

The load lifting capacity of the vehicle having the pallet fork tines 11 is affected by the weight of the pallet fork tine 11. For example, if a vehicle has a lifting capacity of 1,000 pounds, and a pair of the pallet fork tines 11 weight 200 pounds, the "load" lifting capacity of the vehicle is 800 pounds. Hence, there is desire to lighten the weight of the pallet fork tines 11 without reducing the strength of the pallet fork tines 11.

The present invention provides a new pallet fork tine which does not need to pass through an extra tempering or forging process during manufacturing because no load-bearing part of the pallet fork tine is bent during the manufacturing process. The present invention provides a new pallet fork tine wherein several parts of the mounting attachments are integrally formed with the upright member, such that an insufficient welding joint at the mounting attachments would be less likely to lead to a catastrophic failure and separation of the mounting attachments from the upright member. The present invention provides a new pallet fork tine wherein the overall weight of the new pallet fork tine is less than the solid pallet fork tine 11 of FIG. 1, yet the new pallet fork tine is as strong as the solid pallet fork tine 11 of FIG. 1 to handle heavy loads.

These and other objectives are accomplished by a pallet fork attachment for an industrial or farm vehicle, wherein a tine of the pallet fork attachment includes an upright member and a lifting member. The lifting member extends approximately perpendicularly away from a bottom of the upright member to a toe end. Flat pieces of steel are welded together in a stacked formation to form sections of the upright and lifting members. At least two, more preferably three, of the flat pieces of steel are integral, one-piece members forming a part of both of the upright and lifting members. At least one pocket is created within the upright and/or lifting member between the stacked formations of the flat pieces of steel and between the two flat pieces of steel which are integral, one-piece members forming a part of both of the upright and lifting members, so as to reduce the weight of the tine.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein.

DETAILED DESCRIPTION OF EMBODIMENTS OF THE INVENTION

Figure 1:
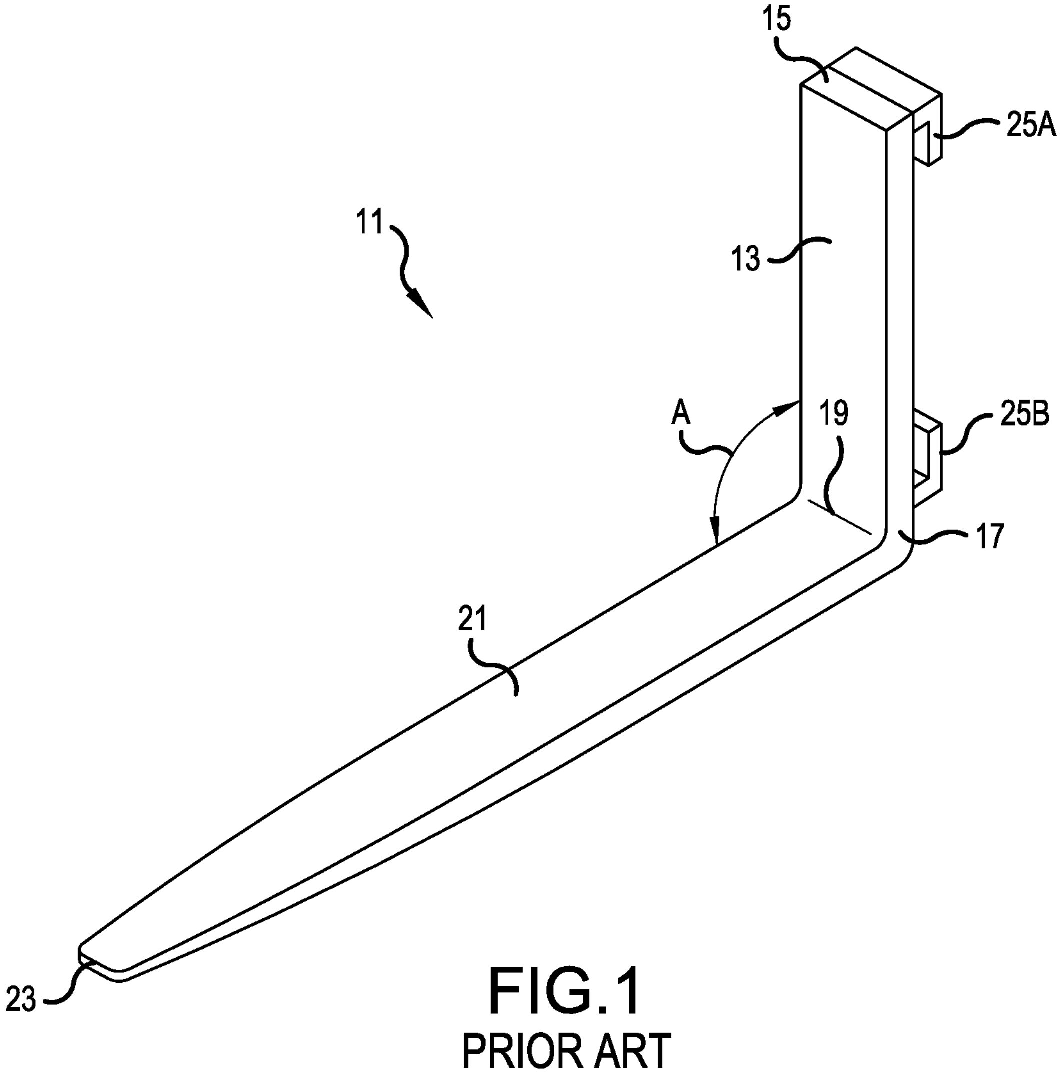
FIG.1 PRIOR ART
FIG. 1 is a front perspective view of a pallet fork tine, in accordance with the prior art.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof. As used herein, the term “and/or” includes any and all combinations of one or more of the associated listed items. As used herein, phrases such as “between X and Y” and “between about X and Y” should be interpreted to include X and Y. As used herein, phrases such as “between about X and Y” mean “between about X and about Y.” As used herein, phrases such as “from about X to Y” mean “from about X to about Y.”

It will be understood that when an element is referred to as being “on”, “attached” to, “connected” to, “coupled” with, “contacting”, etc., another element, it can be directly on, attached to, connected to, coupled with or contacting the other element or intervening elements may also be present. In contrast, when an element is referred to as being, for example, “directly on”, “directly attached” to, “directly connected” to, “directly coupled” with or “directly contacting” another element, there are no intervening elements present. It will also be appreciated by those of skill in the art that references to a structure or feature that is disposed “adjacent” another feature may have portions that overlap or underlie the adjacent feature.

Spatially relative terms, such as “under”, “below”, “lower”, “over”, “upper”, “lateral”, “left”, “right” and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as “under” or “beneath” other elements or features would then be oriented “over” the other elements or features. The device may be otherwise oriented (rotated 90 degrees or at other orientations) and the descriptors of relative spatial relationships used herein interpreted accordingly.

Figure 2:
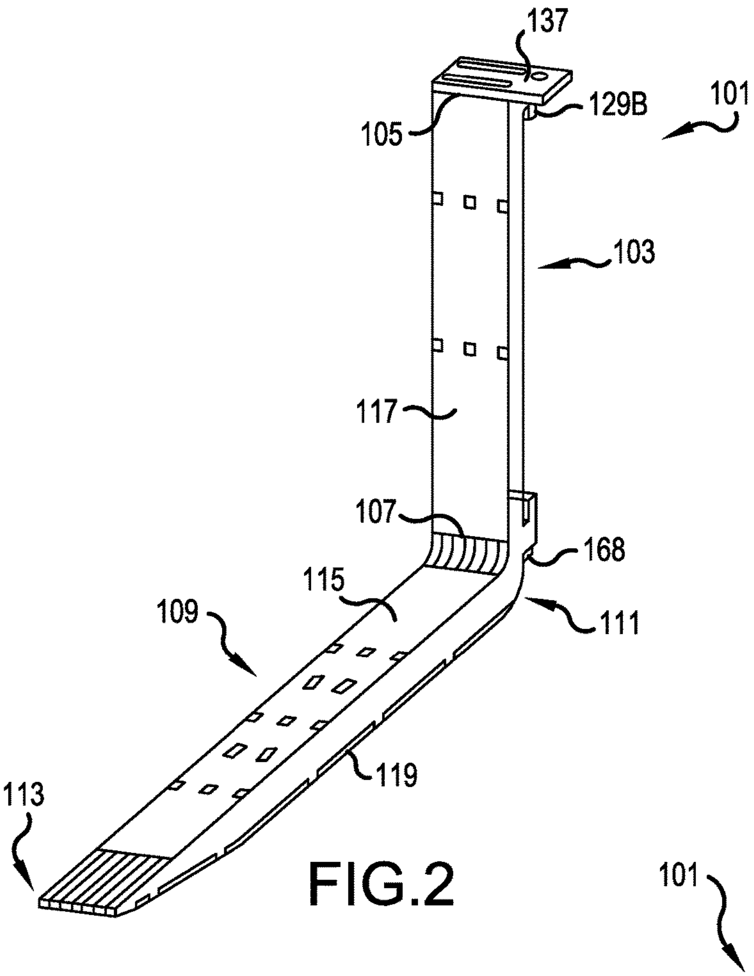
FIG. 2 is a front perspective view of a pallet fork tine, in accordance with the present invention.

FIG. 2 is a front perspective view of a pallet fork tine attachment 101 for industrial or farm vehicles, such as wheeled or track driven tractors, like skid steers, farming tractors, wheel loaders and excavators, in accordance with the present invention. The pallet fork tine 101 includes an upright member 103 extending longitudinally between a top 105 of the upright member 103 and a bottom 107 of the upright member 103.

A lifting member 109 has a heel 111 adjoining with the bottom 107 of the upright member 103 and extending away from the upright member 103 to a toe end 113. The lifting member 109 extends away from the bottom 109 of the upright member 103 at a first angle, which is approximately perpendicular to the upright member 103, such as within plus or minus ten degrees of ninety degrees, more preferably plus or minus five degrees of ninety degrees. In a preferred embodiment, the angle formed between the upright member 103 and the lifting member 109 is in the range of eighty to ninety-five degrees.

Figure 12:
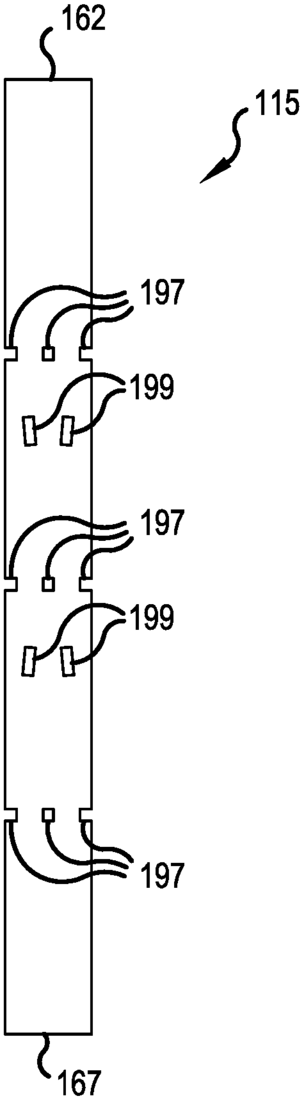
FIG. 12 is a top view of a load plate.

A top face of the lifting member 109 is covered by a lifting plate 115, as shown individually in FIG. 12. A front face of the upright member 103 is covered by a front plate 117, as shown individually in FIG. 13. A bottom face of the lifting member 109 is covered by a ground plate 119, as shown individually in FIGS. 14-15.

Figure 3:
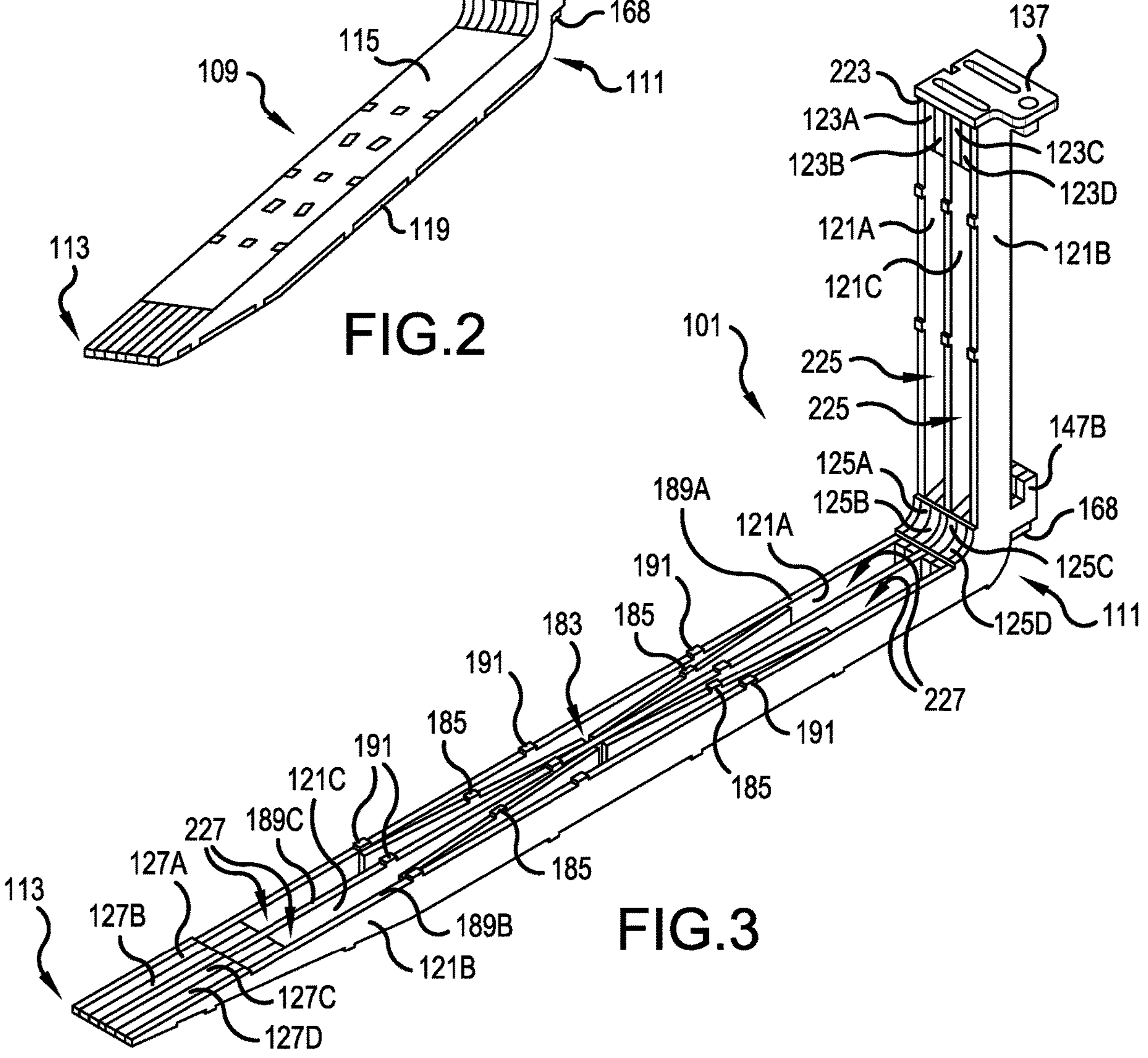
FIG. 3 is a front perspective view of the pallet fork tine of FIG. 2 with cover plates removed.
Figure 4:
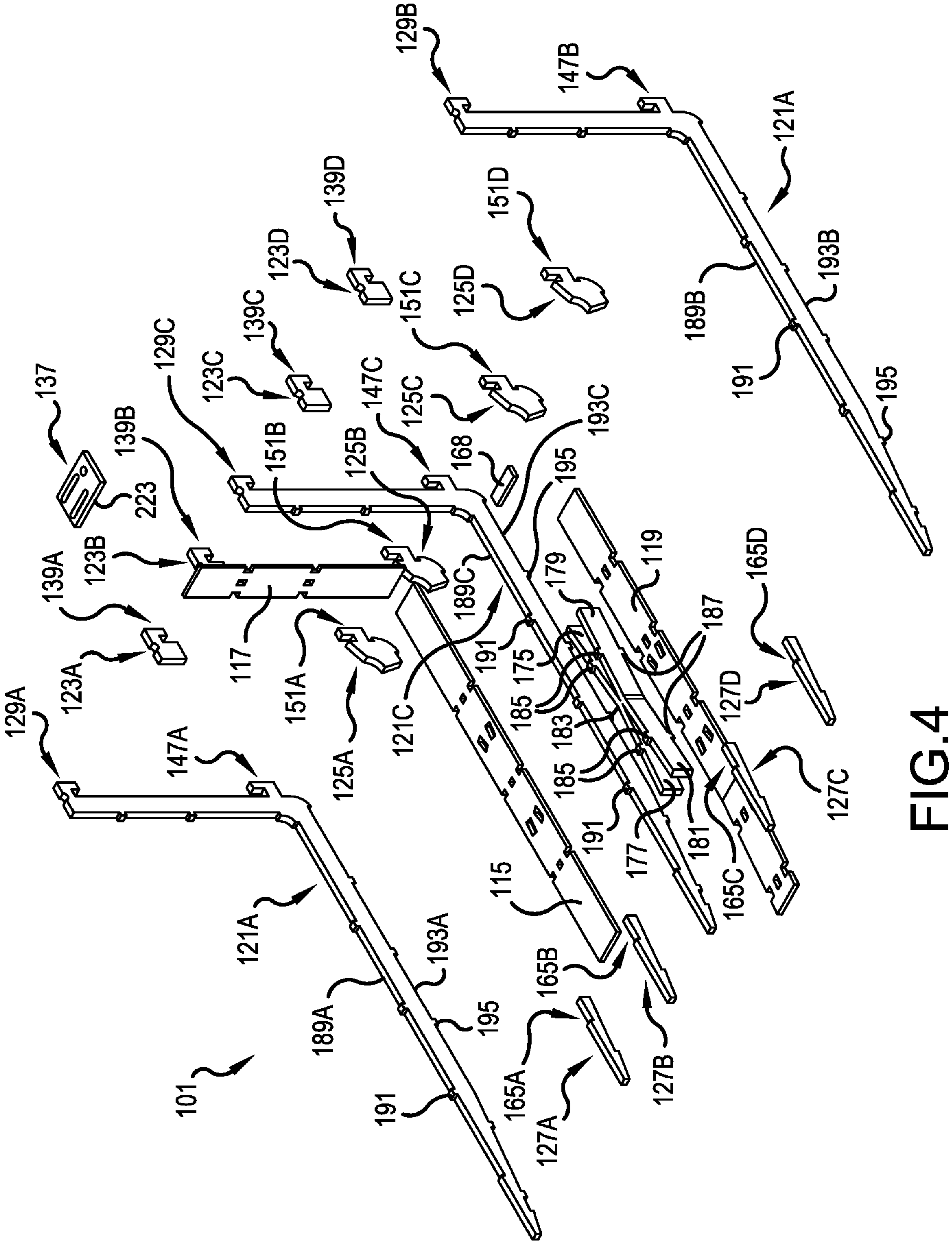
FIG. 4 is a front perspective, exploded view of the pallet fork tine of FIG. 2.

FIG. 3 is a front perspective view of the pallet fork tine of FIG. 2 with the cover plates, i.e., the lifting plate 115, the front plate 117 and the ground plate 119, removed. FIG. 4 is a front perspective, exploded view of the pallet fork tine of FIG. 2, illustrating all of the parts of the pallet fork tine 101, which will be explained hereinafter.

Figure 5:
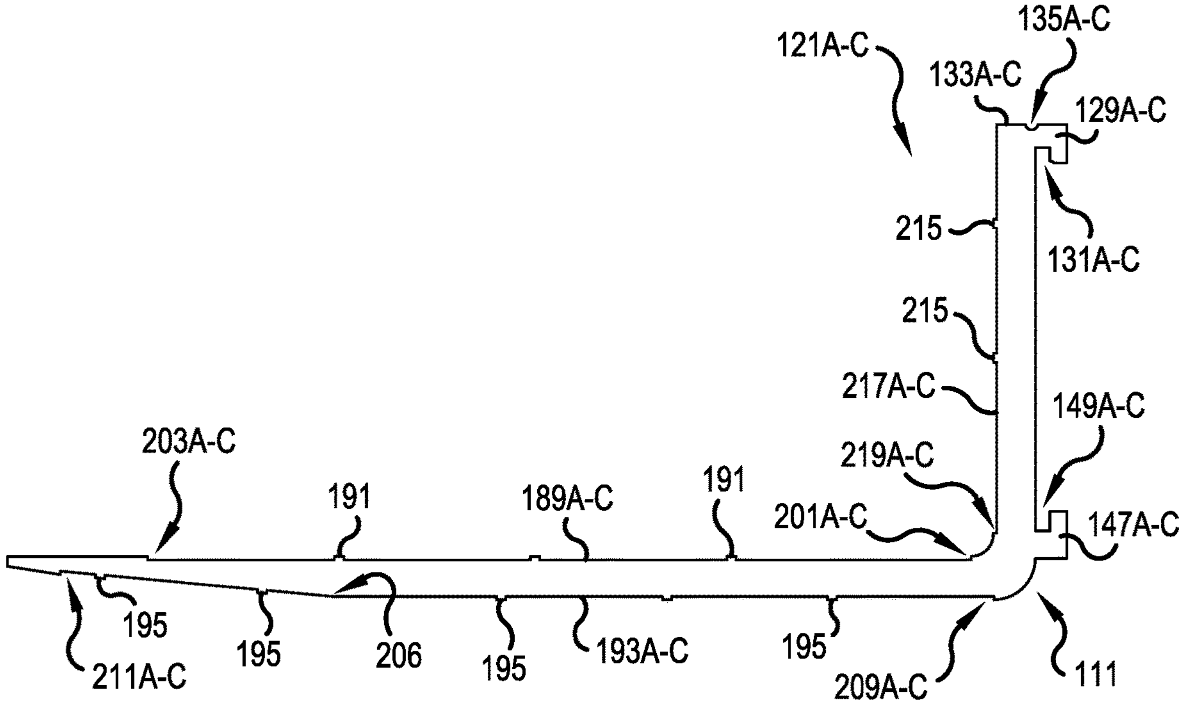
FIG. 5 is a side view of a tine plate, which may serve as a left side tine plate, right side tine plate or center tine plate.

As best seen in the side view of FIG. 5, a one-piece left tine plate 121A forms a part of both the upright member 103 and the lifting member 109. A one-piece right tine plate 121B may be formed identical to the left tine plate 121A and also forms a part of both the upright member 103 and the lifting member 109. A one-piece center tine plate 121C is disposed between the left and right tine plates 121A and 121B. The center tine plate 121C may be formed identical to the left tine plate 121A and also forms a part of both the upright member 103 and the lifting member 108. Each tine plate 121 may be cut from a one-piece, integrally formed solid plate of hardened steel of uniform thickness, such as Hardox® 450 or 500 steel plate.

Figure 6:
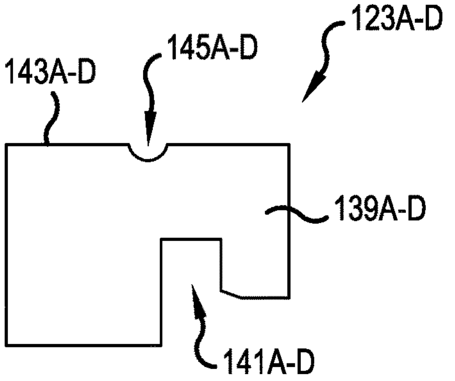
FIG. 6 is a side view of a top spacer.
Figure 7:
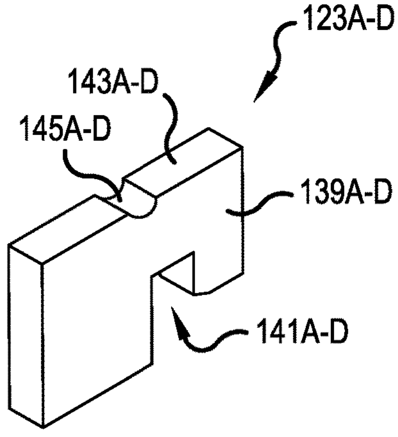
FIG. 7 is a front perspective view of the top spacer of FIG. 6.

As best seen in the side view and front perspective views of FIGS. 6 and 7, one or more left-side top spacers, such as first and second left-side top spacers 123A and 123B are connected between a left side of the center tine plate 121C and a right side of the left tine plate 121A proximate the top 105 of the upright member 103. Likewise, one or more right-side top spacers, such as third and fourth right-side top spacers 123C and 123D, are connected between a right side of the center tine plate 121C and a left side of the right tine plate 121B proximate the top 105 of the upright member 103. The solid, stacking of the first through fourth top spacers 123A-D among and between the left, right and center tine plates 121A-C may be affixed together by welding joints at the junctures along one, several or all of the exposed and abutted edges.

Figure 8:
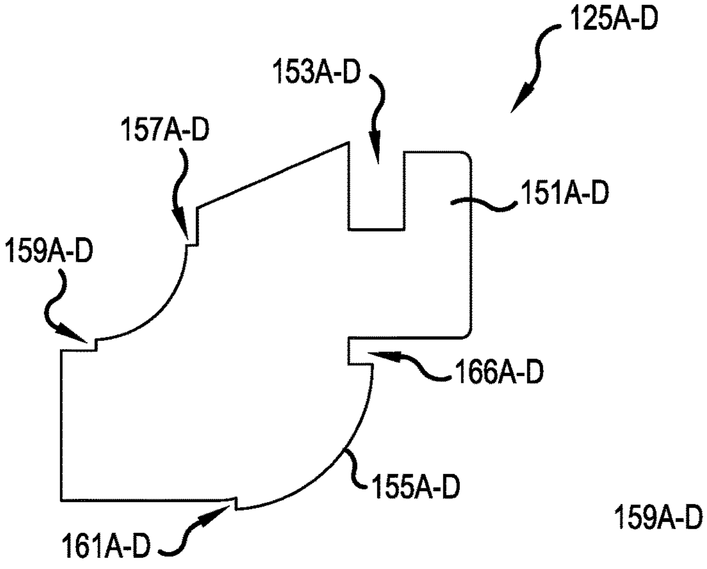
FIG. 8 is a side view of a heel spacer.
Figure 9:
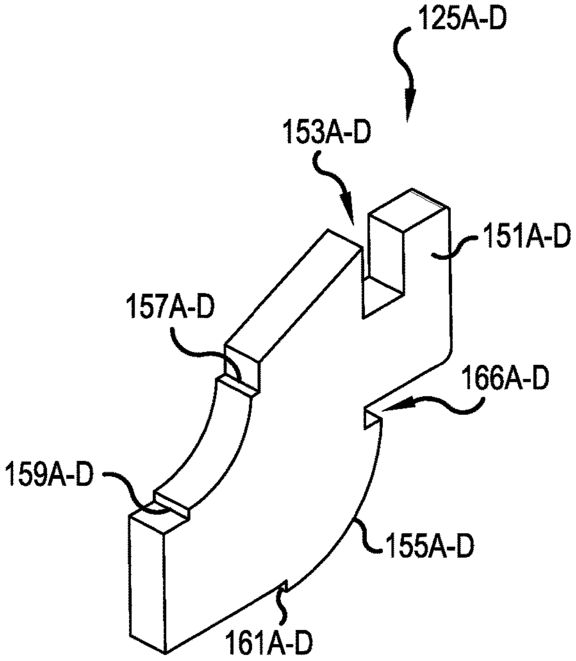
FIG. 9 is a front perspective view of the heel spacer of FIG. 8.

As best seen in the side view and front perspective views of FIGS. 8 and 9, one or more left-side heel spacers, such as first and second left-side heel spacer 125A and 125B, are connected between the left side of the center tine plate 121C and the right side of the left tine plate 121A proximate the heel 111 of the lifting member 109. Likewise, one or more right-side heel spacers, such as third and fourth right-side heel spacers 125C and 125D, are connected between the right side of the center tine plate 121C and the left side of the right tine plate 121B proximate the heel 111 of the lifting member 109. The solid, stacking of the first through fourth heel spacers 125A-D among and between the left, right and center tine plates 121A-C may be affixed together by welding joints at the junctures along one, several or all of the exposed and abutted edges.

Figure 10:
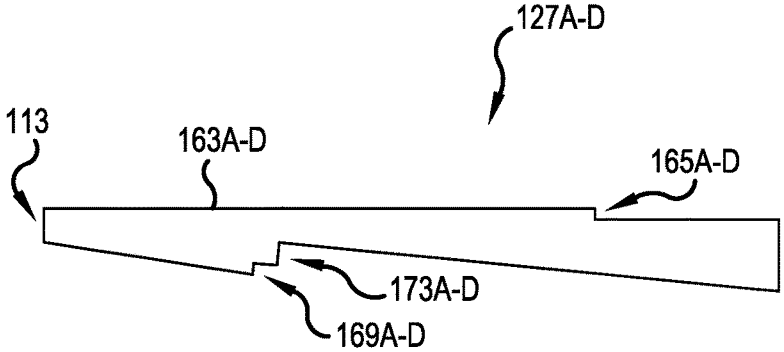
FIG. 10 is a side view of a toe spacer.
Figure 11:
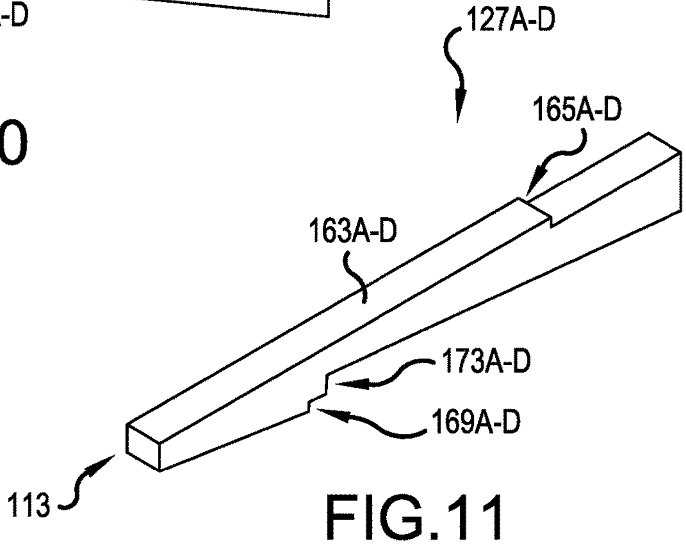
FIG. 11 is a front perspective view of the toe spacer of FIG. 10.

As best seen in the side view and front perspective views of FIGS. 10 and 11, one or more left-side toe spacers, such as first and second left-side toe spacers 127A and 127B, are connected between the left side of the center tine plate 121C and the right side of the left tine plate 121A proximate the toe end 113 of the lifting member 109. Likewise, one or more right-side toe spacers, such as third and fourth right-side toe spacers 127C and 127D, are connected between the right side of the center tine plate 121C and the left side of the right tine plate 121B proximate the toe end 113 of the lifting member 109. The solid, stacking of the first through fourth toe spacers 127A-D among and between the left, right and center tine plates 121A-C may be affixed together by welding joints at the junctures along one, several or all of the exposed and abutted edges.

As best seen in FIG. 5, a first downward, hook-shaped mounting feature 129A is formed integrally with the left tine plate 121A proximate the top 105 of the upright member 103. The first downward, hook-shaped mounting feature 129A has a general u-shaped profile 131A opening toward the bottom 107 of the upright member 103. Similar or same second and third downward, hook-shaped mounting features 129B and 129C are formed integrally with the right tine plate 121B and center tine plate 121C, respectively, proximate the top 105 of the upright member 103 with u-shaped profiles 131B and 131C opening toward the bottom 107 of the upright member 103.

A first top 133A of the left tine plate 121A may optionally include a small first notch 135A proximate a center of the first top 133A of the left tine plate 121A. Second and third notches 135B and 135C may optionally be provided in the second and third tops 133B and 133C of the right and center tine plates 121B and 121C. The first, second and third notches 135A, 135B and 135C may be used as a welding track to secure the stack of the first through fourth top spacers 123A-D among and between the left, right and center tine plates 121A-C, and to also secure a top plate 137, to the first, second and third tops 133A, 133B and 133C of the left, right and center tine plates 121A-C.

As best seen in FIGS. 6 and 7, the first through fourth top spacers 123A-D include fourth downward, hook-shaped mounting features 139A-D formed integrally therewith. The fourth downward, hook-shaped mounting features 139A-D have identical u-shaped profiles 141A-D opening toward the bottom 107 of the upright member 103, as compared to the first, second and third downward, hook-shaped mounting features 129A, 129B and 129C of the left, right and center tine plates 121A, 121B and 121C, so that the when the top spacers 123A-D are stacked with the left, right and center tine plates 121A, 121B and 121C all of the u-shaped profiles 131A-C and 141A-D are aligned prior to welding the stack together.

Tops 143A-D of the first through fourth top spacers 123A-D may optionally include identical and aligned notches 145A-D to the notches 135A-C of the left, right and center tine plates 121A-C to serve as a welding track to secure the stack of the first through fourth top spacers 123A-D among and between the left, right and center tine plates 121A-C, and to also secure the top plate 137, to the tops 143A-D of the top spacers 123A-D.

As also shown in FIG. 5, a first upward, hook-shaped mounting feature 147A is formed integrally with the left tine plate 121A proximate the bottom 107 of the upright member 103. The first upward, hook-shaped mounting feature 147A has a general u-shaped profile 149A opening toward the top 105 of the upright member 103. Similar or same second and third upward, hook-shaped mounting features 147B and 147C are formed integrally with the right tine plate 121B and center tine plate 121C, respectively, proximate the bottom 107 of the upright member 103 with u-shaped profiles 149B and 149C opening toward the top 105 of the upright member 103.

As best seen in FIGS. 8 and 9, the first through fourth heel spacers 125A-D include fourth upward, hook-shaped mounting features 151A-D formed integrally therewith. The fourth upward, hook-shaped mounting features 151A-D have identical u-shaped profiles 153A-D opening toward the top 105 of the upright member 103, as compared to the first, second and third upward, hook-shaped mounting features 147A, 147B and 147C of the left, right and center tine plates 121A, 121B and 121C, so that the when the heel spacers 125A-D are stacked with the left, right and center tine plates 121A, 121B and 121C all of the u-shaped profiles 149A-C and 153A-D are aligned prior to welding the stack together.

A rounded corner 155A-D of each of the first through fourth heel spacers 125A-D has a radius to match the heel 111 of the lifting arm 109. A top seat 157A-D is formed on each of the first through fourth heel spacers 125A-D, which seats a lower edge 160 of the front plate 117. A middle seat 159A-D is formed on each of the first through fourth heel spacers 125A-D, which seats a heel-side edge 162 of the lifting plate 115. A lower seat 161A-D is formed on each of the first through fourth heel spacers 125A-D, which seats a heel-side edge 164 of the ground plate 119.

A notch 166A-D is formed on each of the first through fourth heel spacers 125A-D between the rounded corner 155A-D and the fourth upward, hook-shaped mounting features 151A-D. The notch 166A-D is sized to receive a thickness of a first locking plate 168 (See FIG. 4). The first locking plate 168 has a similar function to the top plate 137 in that the locking plate 168 serves as a lateral member to which the stack with the left, right and center tine plates 121A, 121B and 121C and the first through fourth heel spacers 125A-D therein may be welded with, so as to provide a strong interconnection of the stack at the heel 111.

As best seen in FIGS. 10 and 11, the first through fourth toe spacers 127A-D each include a top engagement surface 163A-D which is exposed and forms a part of the toe end 113 of the pallet fork tine 101. A top seat 165A-D is formed on each of the first through fourth toe spacers 127A-D, which seats a toe-side edge 167 of the lifting plate 115. A lower seat 169A-D is formed on each of the first through fourth toe spacers 127A-D, which seats a toe-side edge 171 of the ground plate 119. A middle seat 173A-D is optionally formed on each of the first through fourth toe spacers 127A-D to seat a second locking plate (not shown, but which may be identical to the first locking plate 168). The second locking plate serves as a lateral member to which the stack with the left, right and center tine plates 121A, 121B and 121C and the first through fourth toe spacers 127A-D therein may be welded with, so as to provide a strong interconnection of the stack at the toe end 113.

A midsection of the lifting member 109 may need additional support and optionally includes first, second, third and fourth crossing support members 175, 177, 179 and 181. The first, second, third and fourth crossing support members 175, 177, 179 and 181 may be individual plates which are welded together at an intersection 183 with the left and right sides of the center tine plate 121C and then spread out in an x-shape and have opposite ends welded to either the right side of the left tine plate 121A or the left side of the right tine plate 121B.

As best shown in FIG. 3, the top edges of the first, second, third and fourth crossing support members 175, 177, 179 and 181 may include projections 185, while the bottom edges of the first, second, third and fourth crossing support members 175, 177, 179 and 181 may include projections 187 (See FIG. 4). The top edges of the first, second, third and fourth crossing support members 175, 177, 179 and 181 are flush with top edges 189A-C of the left, right and center tine plates 121A, 121B and 121C. The top edges 189A-C of the left, right and center tine plates 121A, 121B and 121C include projections 191. The bottom edges of the first, second, third and fourth crossing support members 175, 177, 179 and 181 are flush with bottom edges 193A-C of the left, right and center tine plates 121A, 121B and 121C. The bottom edges 193A-C of the left, right and center tine plates 121A, 121B and 121C include projections 195.

To arrive at the final product, as shown in FIG. 2, the lifting plate 115, the front plate 117 and the ground plate 119 are attached to the structure shown in FIG. 3. As best seen in FIG. 12, the lifting plate 115 includes first notches and/or holes 197 positioned to accept the projections 191 formed on the top edges 189A-C of the left, right and center tine plates 121A, 121B and 121C. The lifting plate 115 includes second holes 199 positioned to accept the projections 185 formed on the top edges of the first, second, third and fourth crossing support members 175, 177, 179 and 181. When assembled, the projections 191 and 185 are welded into the first and second holes/notches 197 and 199. The heel edge 162 of the lifting plate 115 is welded to the middle seats 159A-D formed on each of the first through fourth heel spacers 125A-D and to first seats 201A-C formed on the top edges 189A-C of the left, right and center tine plates 121A, 121B and 121C. The toe edge 167 of the lifting plate 115 is welded to the top seats 165A-D formed on each of the first through fourth toe spacers 127A-D and to second seats 203A-C formed on the top edges 189A-C of the left, right and center tine plates 121A, 121B and 121C.

Figure 14:
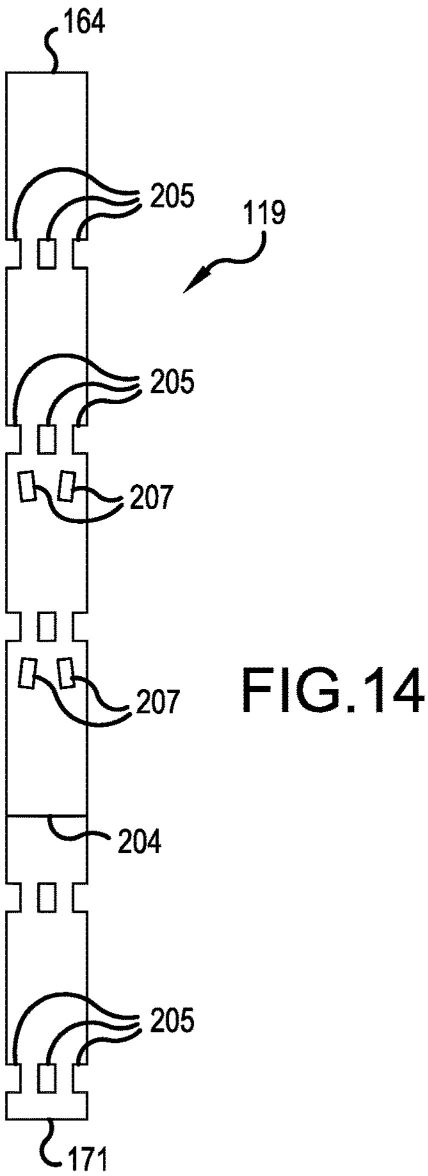
FIG. 14 is a top view of a ground plate.
Figure 15:
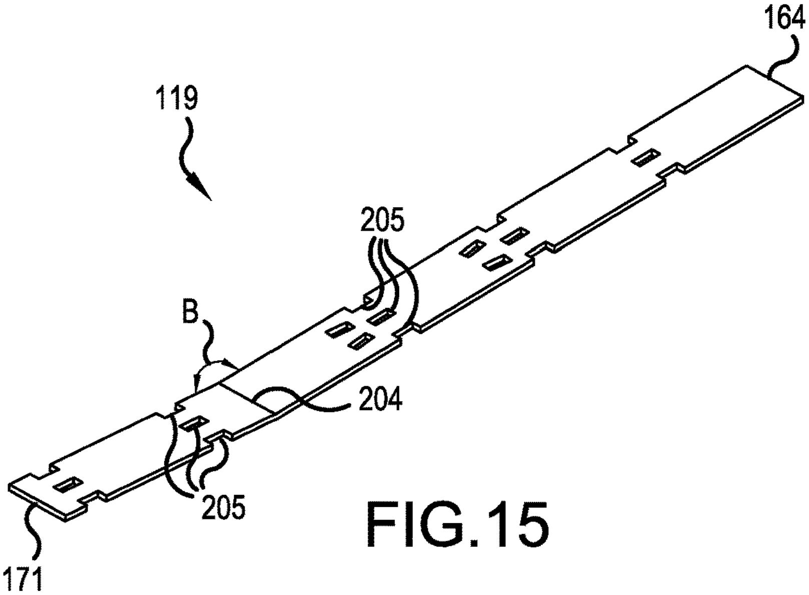
FIG. 15 is a front perspective view of the ground plate of FIG. 14.

As best seen in FIGS. 14 and 15, the ground plate 119 includes third notches and/or holes 205 positioned to accept the projections 195 formed on the bottom edges 193A-C of the left, right and center tine plates 121A, 121B and 121C. The ground plate 119 includes fourth holes 207 positioned to accept the projections 187 formed on the bottom edges of the first, second, third and fourth crossing support members 175, 177, 179 and 181. The ground plate 19 also includes a slight bend 204 to produce an obtuse angle B which conforms to a slight angled section 206 on the bottom edges 193A-C of the left, right and center tine plates 121A, 121B and 121C.

When assembled, the projections 195 and 187 are welded into the third and fourth notches/holes 205 and 207. The heel edge 164 of the ground plate 119 is welded to the lower seats 161A-D formed on each of the first through fourth heel spacers 125A-D and to third seats 209A-C formed on the bottom edges 193A-C of the left, right and center tine plates 121A, 121B and 121C. The toe edge 171 of the ground plate 119 is welded to the lower seats 169A-D formed on each of the first through fourth toe spacers 127A-D and to fourth seats 211A-C formed on the bottom edges 193A-C of the left, right and center tine plates 121A, 121B and 121C.

Figure 13:
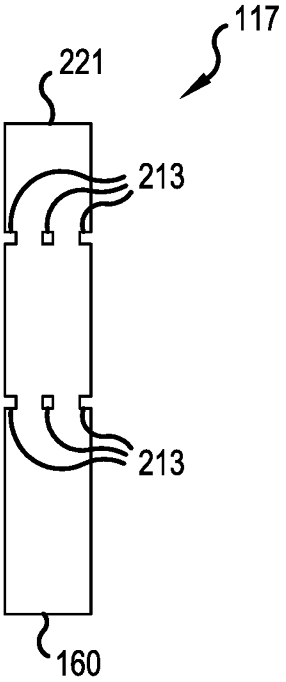
FIG. 13 is a front view of a front plate.

As best seen in FIG. 13, the front plate 117 includes fifth notches and/or holes 213 positioned to accept projections 215 formed on forward edges 217A-C of the left, right and center tine plates 121A, 121B and 121C. When assembled, the projections 215 are welded into the fifth holes/notches 213. The lower edge 160 of the front plate 117 is welded to the top seats 157A-D formed on each of the first through fourth heel spacers 125A-D and to fifth seats 219A-C formed on the forward edges 217A-C of the left, right and center tine plates 121A, 121B and 121C. A top edge 221 of the front plate 117 is welded to an overhanging lip 223 of the top plate 137.

The welding of the projections 185, 187 191, 195 and 215 into the holes/notches 197, 199, 205, 207 and 213 and the welding of the edges 160, 162, 164, 167, 171 and 221 to the seats 157, 159, 161, 165, 169, 201, 203, 209, 211 and 219 and overhanging lip 223 of the top plate 137 locks the laminate construction together and provides improved strength of the overall pallet fork tine 101. Optionally, a back plate on the upright member 103 may be added to the pallet fork tine 101 if desired. After the welding operations, the welds on the lifting plate 115, ground plate 119 and front plate 117 are preferably ground flat and/or smooth, and then the pallet fork tine 101 is painted.

With the above-described structure flat pieces of steel are being welded together in a stacked formation to form the upright member 103 and the lifting member 109. At least two, and more preferably three, of the flat pieces of steel, i.e., the left, right and optionally the center tine plates 121A, 121B and 121C, are integral, one-piece members forming a part of both of the upright member 103 and the lifting member 109. At two portions of the upright member 103, i.e., the top 105 and the bottom 107, the stacked formations of flat pieces of steel are solid due to the top spacers 123 and the heel spacers 125 being positioned between the left, right and center tine plates 121A, 121B and 121C. At the portions of the upright member 103 between the top 105 and the bottom 107, e.g., where the top spacers 123 and the heel spacers 125 are absent, first pockets 225 are formed. The first pockets 225 greatly reduce the weight of the upright member 103. The first pockets 225 may be air filled, or filed with a substance which is lighter in weight per unit volume than the steel used to form the flat plates, such as a foaming insulation or a foaming adhesive.

At two portions of the lifting member 109, i.e., the heel 111 and the toe end 113, the stacked formations of flat pieces of steel are solid due to the heel spacers 125 and the toe spacers 127 being positioned between the left, right and center tine plates 121A, 121B and 121C. At the portions of the lifting member 109 between the heel 111 and the toe end 113, e.g., where the heel spacers 125 and the toe spacers 127 are absent, second pockets 227 are formed. The second pockets 227 greatly reduce the weight of the lifting member 109. The second pockets 227 may be air filled, or filed with a substance which is lighter in weight per unit volume than the steel used to form the flat plates, such as a foaming insulation or a foaming adhesive.

Although only one center tine plate 121C has been shown in the drawing figures, if a more robust pallet fork tine is desired it would be possible to include two or more center tine plates 121C between the left and right tine plates 121A and 121B, with additional spacers 123, 125 and 127 positioned between the two or more center tine plates 121C. If a less robust pallet fork tine is desired, it would be possible to eliminate the center tine plate 121C, leaving only the first, second, third and fourth crossing support members 175, 177, 179 and 181.

Alternately or in addition, the first, second, third and fourth crossing support members 175, 177, 179 and 181 may be eliminated. Although only one pallet fork tine 101 has been shown, a second pallet fork tine 101 would be constructed in a same manner and attached to the lifting frame of the industrial or farming vehicle. The facing hook-shaped mounting features 129, 139, 147, 151 are but one embodiment of a mounting system for the pallet fork tines 101 to attach to the lifting frame of the industrial or farming vehicle. Other types of mounting systems may be employed while still practicing the benefits of the present invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

The invention claimed is:

1. A pallet fork tine attachment for an industrial or farm vehicle, said attachment comprising:

an upright member extending between a top of said upright member and a bottom of said upright member; and a lifting member having a heel adjoining with said bottom of said upright member and extending away from said upright member to a toe end, wherein said lifting member extends away from said bottom of said upright member at a first angle which is approximately perpendicular to said upright member, characterized by flat pieces of steel being welded together in a stacked formation to form said upright member and said lifting member, wherein at least two of said flat pieces of steel are integral, one-piece members forming a part of both of said upright member and said lifting member, and wherein at least one pocket is created within said lifting member by having a flat piece of steel within said stacked formation of said pieces of steel at some portion of said lifting member being absent from said stacked formation of said flat pieces of steel at another portion of said lifting member, said lifting member further including a first crossing support member located within and crossing said at least one pocket so as to extend diagonally to said at least two flat pieces of steel which are integral, one-piece members, wherein a first end of said first crossing support member is welded to one of said at least two flat pieces of steel which are integral, one-piece members and an opposite, second end of said first crossing support member is welded to another of said at least two flat pieces of steel which are integral, one-piece members.

2. The attachment according to claim 1, wherein at least one first second pocket is created within said upright member by having a flat piece of steel within said stacked formation of said flat pieces of steel at some portion of said upright member being absent from said stacked formation of said flat pieces of steel at another portion of said upright member.

3. The attachment according to claim 2, wherein said at least one second pocket is filled with air, foaming insulation or foaming adhesive.

4. The attachment according to claim 2, wherein said at least two of said flat pieces of steel includes three flat pieces of steel which are integral, one-piece members forming a part of both of said upright member and said lifting member, and further comprising:

a front plate attached to front edges of said three flat pieces of steel which are integral, one-piece members forming a part of both of said upright member and said lifting member, wherein said front plate covers a front of said at least one second pocket.

5. The attachment according to claim 2, wherein said first angle is in the range of 80 to 95 degrees.

6. The attachment according to claim 1, wherein said at least two of said flat pieces of steel includes three flat pieces of steel which are integral, one-piece members forming a part of both of said upright member and said lifting member, and further comprising:

a lifting plate attached to top edges of said three flat pieces of steel which are integral, one-piece members forming a part of both of said upright member and said lifting member, wherein said lifting plate covers a top of said at least one pocket.

7. The attachment according to claim 6, further comprising:

a ground plate attached to bottom edges of said three flat pieces of steel which are integral, one-piece members forming a part of both of said upright member and said lifting member, wherein said ground plate covers a bottom of said at least one pocket.

8. The attachment according to claim 1, wherein said lifting member further includes a second crossing support member located within and crossing said at least one pocket so as to extend at an angle relative to said first crossing support member and at an angle relative to said at least two flat pieces of steel which are integral, one-piece members, wherein a first end of said second crossing support member is welded to one of said at least two flat pieces of steel which are integral, one-piece members and an opposite, second end of said second crossing support member is welded to another of said at least two flat pieces of steel which are integral, one-piece members.

9. The attachment according to claim 8, wherein said second end of said first crossing support member is also welded to said first end of said first end of said second crossing support member.

10. A pallet fork tine attachment for an industrial or farm vehicle, said attachment comprising:

an upright member extending between a top of said upright member and a bottom of said upright member; and a lifting member having a heel adjoining with said bottom of said upright member and extending away from said upright member to a toe end, wherein said lifting member extends away from said bottom of said upright member at a first angle which is approximately perpendicular to said upright member, characterized by:

a one-piece left tine plate forming a part of both said upright member and said lifting member;

a one-piece right tine plate forming a part of both said upright member and said lifting member;

a one-piece center tine plate disposed between said left and right tine plates and forming a part of both said upright member and said lifting member;

at least one left-side top spacer connected between a left side of said center tine plate and a right side of said left tine plate proximate said top of said upright member;

at least one right-side top spacer connected between a right side of said center tine plate and a left side of said right tine plate proximate said top of said upright member;

at least one left-side heel spacer connected between said left side of said center tine plate and said right side of said left tine plate proximate said heel of said lifting member;

at least one right-side heel spacer connected between said right side of said center tine plate and said left side of said right tine plate proximate said heel of said lifting member;

at least one left-side toe spacer connected between said left side of said center tine plate and said right side of said left tine plate proximate said toe end of said lifting member; and at least one right-side toe spacer connected between said right side of said center tine plate and said left side of said right tine plate proximate said toe end of said lifting member;

a first pocket formed between said at least one left-side heel spacer and said at least one left-side toe spacer, wherein said first pocket also resides between said one-piece left tine plate and said one-piece center tine plate; and a first crossing support member located within and crossing said first pocket so as to extend at an angle relative to said one-piece left tine plate and said one-piece center tine plate, wherein a first end of said first crossing support member is welded to said one-piece left tine plate and an opposite, second end of said first crossing support member is welded to said one-piece center tine plate.

11. The attachment according to claim 10, wherein said at least one right-side heel spacer includes first and second stacked right-side heel spacers, connected between said right side of said center tine plate and said left side of said right tine plate by one or more welding joints;

wherein said at least one left-side heel spacer includes first and second stacked left-side heel spacers, connected between said left side of said center tine plate and said right side of said left tine plate by one or more welding joints;

wherein said at least one right-side top spacer includes first and second stacked right-side top spacers, connected between said right side of said center tine plate and said left side of said right tine plate by one or more welding joints; and wherein said at least one left-side top spacer includes first and second stacked left-side top spacers, connected between said left side of said center tine plate and said right side of said left tine plate by one or more welding joints;

wherein said at least one right-side toe spacer includes first and second stacked right-side toe spacers, connected between said right side of said center tine plate and said left side of said right tine plate by one or more welding joints; and wherein said at least one left-side toe spacer includes first and second stacked left-side toe spacers, connected between said left side of said center tine plate and said right side of said left tine plate by one or more welding joints.

12. The attachment according to claim 10, further comprising:

a first downward, hook-shaped mounting feature formed integrally with said left tine plate proximate said top of said upright member with a u-shape of said first downward, hook-shaped mounting feature opening toward said bottom of said upright member;

a first upward, hook-shaped mounting feature formed integrally with said left tine plate proximate said bottom of said upright member with a u-shape of said first upward, hook-shaped mounting feature opening toward said top of said upright member;

a second downward, hook-shaped mounting feature formed integrally with said right tine plate proximate said top of said upright member with a u-shape of said second downward, hook-shaped mounting feature opening toward said bottom of said upright member;

a second upward, hook-shaped mounting feature formed integrally with said right tine plate proximate said bottom of said upright member with a u-shape of said second upward, hook-shaped mounting feature opening toward said top of said upright member;

a third downward, hook-shaped mounting feature formed integrally with said center tine plate proximate said top of said upright member with a u-shape of said third downward, hook-shaped mounting feature opening toward said bottom of said upright member; and a third upward, hook-shaped mounting feature formed integrally with said center tine plate proximate said bottom of said upright member with a u-shape of said third upward, hook-shaped mounting feature opening toward said top of said upright member.

13. The attachment according to claim 12, further comprising:

fourth downward, hook-shaped mounting features formed integrally with each of said at least one left-side and right-side top spacers with a u-shape of said fourth downward, hook-shaped mounting features opening toward said bottom of said upright member; and fourth upward, hook-shaped mounting features formed integrally with each of said at least one left-side and right-side heel spacers with a u-shape of said fourth upward, hook-shaped mounting features opening toward said top of said upright member.

14. The attachment according to claim 10, wherein said first angle is in the range of 80 to 95 degrees.

15. The attachment according to claim 10, further comprising:

a front plate attached to front edges of said left, right and center tine plates and forming a front of said upright member;

a lifting plate attached to top edges of said left, right and center tine plates and forming a top of said lifting member; and a ground plate attached to bottom edges of said left, right and center tine plates and forming a bottom of said lifting member.

16. The attachment according to claim 10, wherein said lifting member further includes a second crossing support member located within and crossing said first pocket so as to extend at an angle relative to said first crossing support member and at an angle relative to said one-piece left tine plate and said one-piece center tine plate, wherein a first end of said second crossing support member is welded to said one-piece center tine plate and an opposite, second end of said second crossing support member is welded to said one-piece left tine plate.

17. The attachment according to claim 16, wherein said second end of said first crossing support member is also welded to said first end of said second crossing support member.

18. The attachment according to claim 10, further comprising:

a second pocket formed between said at least one right-side heel spacer and said at least one right-side toe spacer, wherein said second pocket also resides between said one-piece center tine plate and said one-piece right tine plate; and a third crossing support member located within and crossing said second pocket so as to extend at an angle relative to said one-piece right tine plate and said one-piece center tine plate, wherein a first end of said second crossing support member is welded to said one-piece right tine plate and an opposite, second end of said second crossing support member is welded to said one-piece center tine plate.

19. The attachment according to claim 18, wherein said lifting member further includes a fourth crossing support member located within and crossing said second pocket so as to extend at an angle relative to said third crossing support member and at an angle relative to said one-piece right tine plate and said one-piece center tine plate, wherein a first end of said second crossing support member is welded to said one-piece center tine plate and an opposite, second end of said second crossing support member is welded to said one-piece right tine plate.

20. The attachment according to claim 19, wherein said second end of said third crossing support member is also welded to said first end of said fourth crossing support member.

* * * * *